United States Patent [19]

Hanaoka

[11] Patent Number: 4,555,444
[45] Date of Patent: Nov. 26, 1985

[54] MAGNETIC RECORDING MEDIUM AND METHOD FOR MANUFACTURING THE SAME

[75] Inventor: Naohiro Hanaoka, Tokyo, Japan

[73] Assignee: Olympus Optical Co., Ltd., Tokyo, Japan

[21] Appl. No.: 536,211

[22] Filed: Sep. 27, 1983

[30] Foreign Application Priority Data

Apr. 6, 1981 [JP] Japan ................................ 56-51545
Apr. 9, 1981 [JP] Japan ................................ 56-53369

[51] Int. Cl.$^4$ .............................................. G11B 5/08
[52] U.S. Cl. .................................. 428/336; 428/694; 428/695; 427/131; 427/132
[58] Field of Search .................. 427/132, 131, 129; 428/695, 694, 336, 461, 900

[56] References Cited

U.S. PATENT DOCUMENTS

| | | | |
|---|---|---|---|
| 3,715,793 | 2/1973 | Kefalas et al. | 428/928 |
| 4,153,920 | 5/1979 | Shirahata et al. | 360/55 |
| 4,154,875 | 5/1979 | Yanagisawa et al. | 427/130 |
| 4,162,350 | 7/1979 | Yanagisawa et al. | 428/633 |
| 4,188,434 | 2/1980 | Loran | 428/65 |
| 4,281,043 | 7/1981 | Deffeyes | 428/694 |
| 4,307,156 | 12/1981 | Yanagisawa | 428/694 |

FOREIGN PATENT DOCUMENTS 52-43081 10/1977 Japan ................................ 427/131

*Primary Examiner*—Norman Morgenstern
*Assistant Examiner*—Ken Jaconetty
*Attorney, Agent, or Firm*—Frishauf, Holtz, Goodman & Woodward

[57] ABSTRACT

A magnetic recording medium has a base film, an under coating layer formed on the base film, and two magnetic films formed on the under coating layer. An intermediate layer having little stiffness is interposed between the magnetic films to separate them.

23 Claims, 1 Drawing Figure

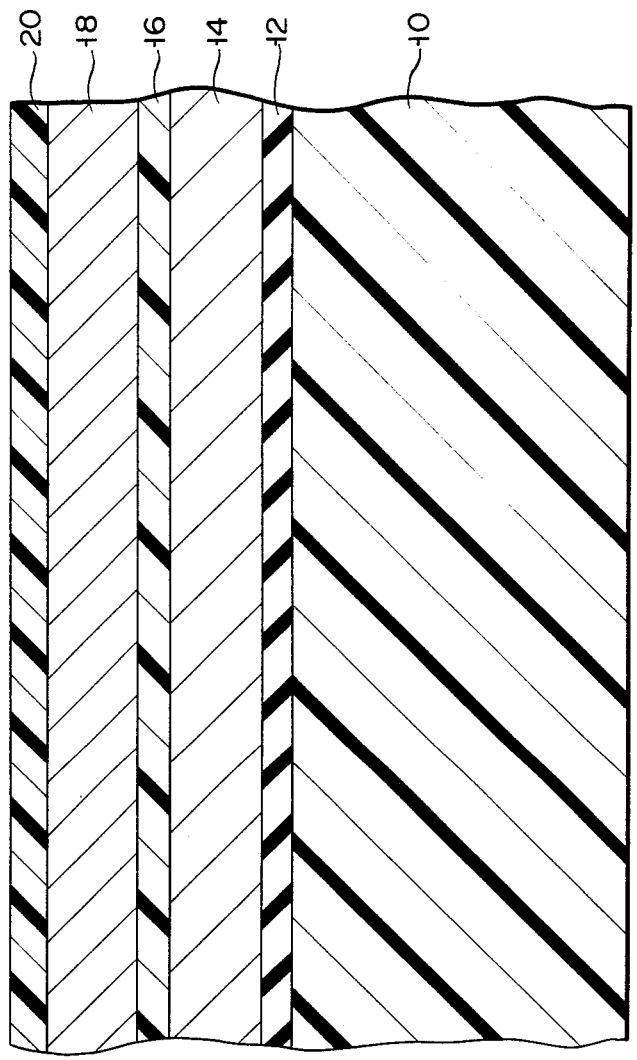

MAGNETIC RECORDING MEDIUM AND METHOD FOR MANUFACTURING THE SAME

CROSS-REFERENCE TO RELATED APPLICATION

This is a CIP application of U.S. Pat. Ser. No. 361,471 filed on Mar. 23, 1982, now abandoned.

BACKGROUND OF THE INVENTION

The present invention relates to a magnetic recording medium and a method for manufacturing the same.

As a high-density recording medium, a metal thin film type magnetic recording tape which does not contain a binder has recently been receiving a lot of attention. Various methods exist for manufacturing metal thin film type magnetic recording tape, including the vacuum deposition method, the sputtering method, the ion-plating method and so on. A magnetic recording tape manufactured by growing crystals of a magnetic metal by one of such methods has a high residual magnetic flux density and little tendency toward self-demagnetization. In a magnetic recording tape manufactured by one of these methods, the thickness of the magnetic layer can be made extremely small as compared with a conventional magnetic recording tape of the coating type which is manufactured by coating magnetic particles mixed with a binder on a base film. For this reason, with the methods mentioned above, a magnetic recording tape is obtained which is capable of a long recording time and suitable for high-density recording (the thinner the magnetic recording layer, the better the high frequency response during recording and playback).

Despite the advantages as described above, the magnetic recording tape obtained by forming a ferromagnetic metal thin film by vacuum deposition or sputtering is subject to a drawback which is not encountered in the coating type magnetic recording tape. More specifically, the metal thin film type magnetic recording tape has a significantly greater stiffness. A metal thin film type magnetic recording tape of substantially the same output as a coating type magnetic recording tape has a very small thickness but has a stiffness almost twice as much as that of the latter. In other words, the metal thin film type magnetic recording tape is too stiff and lacks flexibility. For this reason, good head touch is hard to obtain and tape travel is unstable with the metal thin film type magnetic recording tape.

A prior art technique has been proposed in Japanese Patent Disclosure No. 53-73,109 to solve this problem. According to this prior art technique, a nonmagnetic metal having a low Young's modulus is mixed in the ferromagnetic metal film. This prior art technique attempts to reduce the stiffness of the magnetic recording tape by adopting a composite magnetic film. With this prior art technique, it is indeed possible to manufacture a metal thin film type magnetic recording tape which has relatively little stiffness. However, this technique is also subject to some drawbacks. Since the composite magnetic film is formed by the two-component deposition method, it is difficult to form a magnetic film of uniform composition. In addition to this, the low stiffness intended by the applicant of the present application cannot be achieved by simply mixing a metal having a low Young's modulus in the ferromagnetic metal film.

The metal thin film type magnetic recording tape is also subject to the following problems. When the magnetic metal recrystallizes on the base film, internal stress is generated and the film curls. Furthermore, the surface of the thin magnetic layer formed by the vacuum deposition method or the like is indented when it is observed microscopically. Curling of the film adversely affects the head touch or stable tape travel, and the indented surface of the tape increases the level fluctuations in high frequency range.

Another prior art technique is proposed in Japanese Patent Disclosure No. 54-155,012 which may look similar to the present invention. According to this prior art technique, a high polymer thin film is formed on a base film. After calendering, a magnetic film is formed on the high polymer thin film. This method attempts to improve the mechanical strength of the overall film while maintaining good adhesion of the magnetic film. However, this technique does not deal with the technical subject matter of the present invention. The present invention totally differs from this prior art technique in the manufacturing steps after the formation of said high polymer thin film.

SUMMARY OF THE INVENTION

The present invention has been designed considering the above and provides a magnetic recording medium and a method for manufacturing the same, which simultaneously achieve high-density recording which is a characteristic of a metal thin film type magnetic recording tape and flexibility which is a characteristic of a coating type magnetic recording tape.

To achieve the above object, according to a magnetic recording medium of the present invention, a magnetic thin film is multilayered, and an intermediate layer of a high polymeric compound is formed between layers of the multilayered magnetic thin film. Since this intermediate layer has a stiffness significantly lower than that of the magnetic thin film, the overall magnetic recording medium has a low bending strength. Thus, this intermediate layer serves as a slip layer between the adjacent magnetic films and serves, in effect, to reduce the stiffness of the overall medium. Since the magnetic film itself is a ferromagnetic film having a very small thickness, high-recording density can be maintained. Furthermore, since the overall thickness of the magnetic recording films may be freely selected, the overall coercive force may be freely set.

It is another object of the present invention to provide a method for manufacturing a magnetic recording medium which achieves improved level stability in addition to the improvements in recording density and flexibility.

To achieve this object, according to the present invention, a multilayered magnetic thin film separated by an elastic intermediate layer is formed on a base film, and the multilayered magnetic thin film is calendered.

The intermediate layer serves as a cushion between the adjacent magnetic thin films. Therefore, the stiffness of the overall magnetic film is reduced, and a flexible magnetic recording medium is provided. Since the magnetic thin film itself can be made of a ferromagnetic metal which is very thin and which has high coercive force, high-density recording is not impaired. The base film after the formation of the magnetic thin film is calendered. Then, the stress of the overall magnetic recording medium is eliminated, and mechanical distortion such as curling, as described above, is eliminated. Since the surface of the magnetic film is made smooth by calendering, level fluctuations and dropout are significantly reduced. In addition to this, the overall thickness of the magnetic film can be freely changed according to the selected thickness of the intermediate layer. Therefore, the magnitude of the coercive force may be freely set even if the type of the magnetic body, the thickness of the overall magnetic recording medium, and the thickness of the base film are fixed. The intermediate layer also serves to increase the coercive force of the overall magnetic thin film.

BRIEF DESCRIPTION OF THE DRAWING

FIG. 1 is a sectional view showing a magnetic recording medium according to an embodiment of the present invention.

DETAILED DESCRIPTION OF THE PREFERRED EMBODIMENTS

The preferred embodiments of the present invention will now be described with reference to the accompanying drawing. A description will be made of a case wherein the present invention is applied to a bilayered metal thin film type magnetic tape.

Referring to FIG. 1, a nonmagnetic metal film (under coating layer) 12 of aluminum or the like is formed on a base film 10 by the electron beam deposition method or the like. The base film 10 may comprise a polyester film having a thickness of 6 μm. A magnetic metal film 14 of a Co-Ni (cobalt-nickel) alloy or the like is formed on the under coating layer 12 by the electron beam deposition method or the like. With respect to the composition of the Co-Ni alloy, Co≈75 atm % and Ni≈25 atms % are suitable for audio recording, while Co≈80 atm % and Ni≈20 atm % are suitable for video recording. The magnetic metal film 14 is formed to a thickness of about 1,000 Å. The base film 10 with the films 12 and 14 formed thereon is fed to a conventional applicator such as a gravure coater. Such a conventional applicator is introduced, for example, in "MAGNETIC RECORDING" in Science and Industry, Edited by C. B. Pear, Jr., REINHOLD PUBLISHING CORP., U.S.A. A high polymeric compound dissolved in a solvent is then coated on the magnetic metal film 14. The coated film is dried by heat to provide a nonmagnetic intermediate layer 16. The thickness of the intermediate layer 16 is controlled to be 200 to 800 Å. The intermediate layer 16 may consist of an acrylic resin, a polyurethane resin, or an epoxy resin. After the intermediate layer 16 is formed, the base film 10 is fed into a deposition apparatus. Another magnetic metal film 18 is formed on the intermediate layer 16 to a thickness of about 1,000 Å. A Co-Ni alloy of Co≈75 atm % and Ni≈25 atm % (audio recording), or a Co-Ni alloy of Co≈80 atm % and Ni≈20 atm % (video recording), is suitable material for the film 18. A protective layer 20 is formed on the magnetic metal film 18 in a similar manner to that of the intermediate layer 16. The protective layer 20 may consist of a mixture of resin (e.g. an epoxy resin) and lubricant.

The bilayered metal thin film type magnetic recording tape of the structure as described above was actually manufactured. The magnetic recording tape obtained had a stiffness which was slightly greater than that of an equivalent coating type magnetic recording tape. Although this metal thin film type magnetic recording tape had slightly more stiffness than that of the coating type tape, it had significantly less stiffness than that of conventional metal thin film type magnetic recording tapes.

If an increase in the number of coating steps involved does not present a problem, the under coating layer 12 may comprise a high polymeric resin film. In this case, the stiffness of the overall magnetic film may be reduced further.

Another embodiment of the present invention will now be described. This embodiment will also be described with reference to a bilayered metal thin film type magnetic recording tape.

Referring to FIG. 1, a nonmagnetic metal film (under coating layer) 12 of aluminum or the like is formed on a base film 10 by electron beam deposition or the like. The base film 10 may be a polyester film having a thickness of about 5.5 μm. A magnetic metal film 14 of a Co-Ni (cobalt-nickel) alloy is formed from a slanting direction on the under coating layer 12 by the electron beam deposition method. The thickness of the magnetic metal film 14 is selected to be about 1,000 Å. The base film 10 with the films 12 and 14 formed thereon is fed into a conventional coater such as gravure coater. A high polymeric compound dissolved in a solvent is coated on the magnetic metal film 14 in the coater. The coated layer is dried by heat to provide a nonmagnetic intermediate layer 16. The thickness of the intermediate layer 16 is selected to be about 500 Å, for example, and is generally selected to be within the range of 100 to 1,500 Å. The raw material of the intermediate layer 16 may be an acrylic resin having an epoxy group or a polyurethane resin. The following mixture may be used for said epoxy group.

Shell OL53-B40 (Trade Name): 10 g
Molylube SOM (Trade Name): 1 g
Cyclohexanone: 150 ml
Etylene Glycol Monoetyle Ether: 150 ml
Methyl Ethyl Ketone: 390 ml
Methyl Iso Butyl Ketone: 300 ml After the formation of the intermediate layer 16, the base film 10 is fed into a deposition apparatus to form another magnetic metal film 18 on the intermediate layer 16. The thickness of the film 18 is controlled to be about 1,000 Å. A protective layer 20 is formed on the magnetic metal film 18 in a similar manner to that of the intermediate layer 16. The protective layer 20 may consist of a mixture of a resin with a lubricant.

The metal thin film type magnetic recording tape manufactured in the manner as described above is then subjected to calendering under the conditions below:

Heat roll temperature: 80° to 110° C.
Calendering pressure: 30 to 100 kg/cm²
Calendering rate: about 15 m/min The magnetic recording film calendered under the above conditions is cut to a width of about 3 mm to provide a magnetic recording tape.

A bilayered thin film type magnetic recording tape of the structure as described above was manufactured. The magnetic recording tape obtained had a stiffness which was slightly greater than that of an equivalent coating type magnetic recording tape. Although the thin film type magnetic recording tape had a stiffness slightly greater than that of a coating type magnetic recording tape, the flexibility was better than the conventional thin film type magnetic recording tape. The thin film type magnetic recording tape obtained was driven at a speed of 2.4 cm/s to record and reproduce sine waves of 8 kHz. The level fluctuations and spacing loss were significantly reduced as compared to a tape manufactured by the conventional method. Furthermore, since the stiffness of the tape is significantly reduced by the intermediate layer 16, inner stress caused in the magnetic metal layers 14 and 18 is easy to eliminate. In fact, thermal strain such as wrinkles and curling were not observed in the magnetic recording film after calendering due to heat applied during calendering.

Although relative stiffnesses among the layers 12 to 20 can be derived from their particular physical properties, measurement for obtaining a value of each stiffness of the thin layers 12 to 20 is impossible according to a presently available measuring technique. Only the value of the stiffness of the completed magnetic tape as shown in FIG. 1 can be measured. A stiffness is substantially proportional to a Young's modulus E, and the modulus E is a proportion constant between a stress $\sigma$ and a strain $\epsilon$ ($\sigma = \epsilon E$). Accordingly, a stiffness may be estimated by a Young's modulus E which can be determined from a stress $\sigma$ and a strain $\epsilon$.

The preferred Young's modulus E for a magnetic tape of the present invention is approximately 750 kg/mm$^2$ or less, i.e. $E \leq 750$ kg/mm$^2$. This value $E = 750$ kg/mm$^2$ is determined from measurement of tension applied to the tape which is stretched with a constant velocity of 100 mm/min until 2% strain $\epsilon$ occurs.

The preferred Young's modulus E for the base film 10 which is made of polyester is approximately 600 kg/mm$^2$. The length of a test piece (polyester film) is 100 mm, the tensioning speed is 100 mm/min, and the measuring strain $\epsilon$ is 2%. A load cell of 5 kg is used in this measuring.

The lower limit of the preferred Young's modulus E depends on many factors, e.g., the type or kind of the magnetic tape. Thus, the lower limit of the modulus E can be determined depending on the type of tape.

It is not preferable to use a nonmagnetic metal having a great stiffness for the intermediate layer 16 in place of a high polymeric compound. When the intermediate layer 16 is made of such a metal, the object of the present invention may not be achieved even if calendering as described above is performed. Although the intermediate layer of hard metal may serve to slightly reduce thermal strain such as curling, it does not improve head touch or tape travel stability. If a substance having a relatively high elasticity, such as a high polymer compound, is used for the intermediate layer 16, the elasticity moderates the thermal strain. Furthermore, the elasticity of the intermediate layer 16 also serves to absorb, through the heat generated during calendering, the thermal strain during the formation of the thin film.

The embodiments described herein and shown in the drawing are not intended to restrict the present invention. Various variations are possible within the scope of the appended claims. For example, the intermediate layer 16 may contain fine carbon particles having a particle size of about 300 Å. In this case, the conductivity of the intermediate layer 16 may be increased. More than two metal magnetic films may be formed, and the intermediate layer 16 may be formed between each pair of adjacent metal magnetic films. In either case, a thin film type magnetic recording tape having a flexibility equivalent to that of a coating type magnetic recording tape can be obtained by separating magnetic thin films with high stiffness by the intermediate layer or layers. Head touch and tape travel stability are further improved by calendering.

In general, the intermediate layer 16 conveniently comprises a high polymeric compound. If an increase in the number of coating steps involved does not present a problem, the under coating layer 12 may comprise a high polymeric resin layer. In this case, the stiffness of the overall magnetic recording tape may be further reduced. The films 12 and 14 may be made by a thin film forming apparatus disclosed in Japanese Patent Application No. 55-176,578 by the same applicant as the present application (OLYMPUS OPTICAL CO.). As in also disclosed in Japanese Patent Application No. 55-35,815 (corresponding to U.S. Ser. No. 244,807 filed on Mar. 17, 1981 which issued as U.S. Pat. No. 4,410,583 on Oct. 18, 1983) by the same applicant as the present invention, the protective layer 20 may also comprise a magnetic layer containing a binder. The disclosures of the above two prior applications are combined with the present invention. A method for forming a vacuum deposited ferromagnetic film is also disclosed in U.S. Pat. No. 3,342,632 (G. Bate et al. issued on Sept. 19, 1967). This method is combined herewith as a method for forming the films 12, 14 and 18.

What is claimed is:

1. A magnetic recording medium comprising:
   a base film;
   an under coating layer formed on said base film;
   a plurality of metal thin magnetic films formed on said under coating layer,
   said under coating layer comprising a nonmagnetic material having a stiffness less than the stiffness of said metal thin magnetic films; and
   an intermediate layer having a thickness of about 200 Å to about 800 Å which is formed between adjacent magnetic films to separate said magnetic films from each other, said intermediate layer comprising a high polymeric resin having a stiffness less than the stiffness of said magnetic films.

2. The magnetic recording medium of claim 1, wherein said under coating layer is made of a high polymeric compound having a stiffness less than the stiffness of said magnetic films.

3. The magnetic recording medium of claim 1, wherein a protective layer is formed on the uppermost film of said plurality of metal thin magnetic films.

4. The magnetic recording medium of claim 3 wherein said protective layer is made of a material which has a stiffness less than said metal thin magnetic films.

5. A process for making magnetic recording medium which comprises the steps of:
   forming an under coating layer, comprising a nonmagnetic material having stiffness less than the stiffness of the metal thin magnetic film which is subsequently formed on said under coating layer, of a predetermined thickness on a base film, forming a first metal thin magnetic film of a predetermined thickness on said under coating layer, forming an intermediate layer of a high polymeric resin and a thickness of about 200 Å to about 800 Å on said first metal thin magnetic film, and forming a second thin magnetic film of a predetermined thickness on said intermediate layer, the stiffness of said intermediate layer being less than the stiffness of said metal thin magnetic films.

6. The process of claim 5, further comprising the step of forming a protective layer of a predetermined thickness on said second metal thin magnetic film.

7. The process of claim 6, wherein said base film, said under coating layer, said intermediate layer and said protective layer are made of a material which has stiffness less than the stiffness of said first and second metal thin magnetic films.

8. A magnetic recording medium manufactured by a process according to claim 5.

9. A process for making a magnetic recording medium which comprises the steps of:
   forming an under coating layer, comprising a nonmagnetic material having stiffness less than the stiffness of the metal thin magnetic film which is subsequently formed on said under coating layer, of a predetermined thickness on a base film,
   forming a first metal thin magnetic film of a predetermined thickness on a base film, forming a nonmagnetic elastic intermediate layer a thickness of about 200 Å to about 800 Å on said first metal thin magnetic film, forming a second metal thin magnetic film of a predetermined thickness on said intermediate layer, said intermediate layer having stiffness less than the stiffness of said first and second thin magnetic films, to form a multilayered magnetic film and calendering said multilayered magnetic film.

10. The process of claim 9, further comprising the step of forming a protective layer on the uppermost film of said multilayered magnetic metal thin film prior to the step of calendering.

11. The process of claim 10, wherein said base film, said intermediate layer, and said protective layer are made of a material which has a stiffness less than the stiffness of said first and second metal thin magnetic films.

12. A magnetic recording medium manufactured by the process according to claim 9.

13. The magnetic recording medium of claim 1, wherein said metal thin magnetic films are cobalt-nickel alloy thin magnetic films.

14. The magnetic recording medium of claim 2, wherein said metal thin magnetic films are cobalt-nickel alloy thin magnetic films.

15. The magnetic recording medium of claim 3, wherein said metal thin magnetic films are cobalt-nickel alloy thin magnetic films.

16. The magnetic recording medium of claim 4, wherein said metal thin magnetic films are cobalt-nickel alloy thin magnetic films.

17. The magnetic recording medium of claim 2, wherein a protective layer is formed on the uppermost film of said plurality of metal thin magnetic films.

18. A magnetic recording medium manufactured by the process according to claim 6.

19. A magnetic recording medium manufactured by the process according to claim 7.

20. A magnetic recording medium manufactured by the process according to claim 10.

21. A magnetic recording medium manufactured by the process according to claim 11.

22. The magnetic recording medium of claim 2, wherein said metal thin magnetic films are cobalt-nickel alloy thin magnetic films.

23. The magnetic recording medium of claim 1, wherein the thickness of said metal thin magnetic films is about 1000 Å.

* * * * *

UNITED STATES PATENT AND TRADEMARK OFFICE
CERTIFICATE OF CORRECTION

PATENT NO. : 4,555,444
DATED     : November 26, 1985
INVENTOR(S) : Naohiro HANAOKA It is certified that error appears in the above-identified patent and that said Letters Patent is hereby corrected as shown below:

On the initial page of the patent, in the heading between "[22] Filed: Sep. 27, 1983" and "Foreign Application Priority Data" insert --Related U.S. Application Data

[63] CIP of Ser. No. 361,471, Mar. 23, 1982, abandoned.--.

Column 6 (claim 5), line 47, after "making" insert --a--;

Column 6 (claim 7), line 68, after "which has" insert --a--;

Column 7 (claim 9), line 19, after "second" insert --metal--.

Signed and Sealed this

Sixteenth Day of September 1986

[SEAL]

Attest:

DONALD J. QUIGG

Attesting Officer

Commissioner of Patents and Trademarks